United States Patent
Lai et al.

(10) Patent No.: US 10,216,250 B2
(45) Date of Patent: *Feb. 26, 2019

(54) MEMORY APPARATUS AND ENERGY-SAVING CONTROL METHOD THEREOF

(71) Applicant: VIA Technologies, Inc., New Taipei (TW)

(72) Inventors: Yi-Lin Lai, New Taipei (TW); Chen-Te Chen, New Taipei (TW)

(73) Assignee: VIA Technologies, Inc., New Taipei (TW)

( * ) Notice: Subject to any disclaimer, the term of this patent is extended or adjusted under 35 U.S.C. 154(b) by 63 days.

This patent is subject to a terminal disclaimer.

(21) Appl. No.: 15/193,125

(22) Filed: Jun. 27, 2016

(65) Prior Publication Data

US 2017/0285718 A1   Oct. 5, 2017

(30) Foreign Application Priority Data

Mar. 30, 2016   (TW) .............................. 105110067 A (51) Int. Cl.
*G06F 1/32*   (2006.01)
*G06F 12/02*  (2006.01)
(Continued)

(52) U.S. Cl.
CPC ............ *G06F 1/324* (2013.01); *G06F 1/3237* (2013.01); *G06F 12/0238* (2013.01);
(Continued)

(58) Field of Classification Search
CPC . G06F 1/263; G06F 1/266; G06F 1/28; G06F 1/32; G06F 1/3206; G06F 1/3231
See application file for complete search history.

(56) References Cited

U.S. PATENT DOCUMENTS

2003/0126356 A1   7/2003   Gustavson et al.
2003/0200474 A1   10/2003  Li
(Continued)

FOREIGN PATENT DOCUMENTS

TW   201329847   7/2013
TW   201346928   11/2013
(Continued)

OTHER PUBLICATIONS

"Notice of Allowance of Taiwan Counterpart Application", dated Dec. 28, 2016, p. 1-p. 4.
(Continued)

*Primary Examiner* — Terrell S Johnson
(74) *Attorney, Agent, or Firm* — JCIPRNET (57) ABSTRACT

A memory apparatus and an energy-saving control method thereof are provided. The memory apparatus includes a plurality of non-volatile memory units and a control chip, and the control chip includes a specific circuit group, a memory control unit and an energy-saving control unit. The memory control unit controls an access to the non-volatile memory units. In a normal mode and during a period of accessing the non-volatile memory units by the control chip, if the non-volatile memory units are in a busy state, the energy-saving control unit controls the clock generation unit to stop outputting an internal clock signal to the specific circuit group, so as to reduce power consumption of the control chip.

33 Claims, 5 Drawing Sheets

(51) Int. Cl.
*G06F 13/14* (2006.01)
*G06F 1/324* (2019.01)
*G06F 1/3237* (2019.01)
*G06F 1/3296* (2019.01)

(52) U.S. Cl.
CPC ............ *G06F 1/3296* (2013.01); *G06F 13/14* (2013.01); *G06F 2212/222* (2013.01); *G06F 2212/251* (2013.01); *Y02D 10/13* (2018.01)

(56) References Cited

U.S. PATENT DOCUMENTS

| | | | | |
|---|---|---|---|---|
| 2004/0158750 | A1* | 8/2004 | Syed | ............... G06F 1/3203 713/320 |
| 2008/0148083 | A1* | 6/2008 | Pesavento | ............ G06F 1/3203 713/322 |
| 2011/0055509 | A1 | 3/2011 | Ware et al. | |
| 2012/0023351 | A1* | 1/2012 | Wakrat | ............... G06F 1/3203 713/322 |
| 2014/0173307 | A1* | 6/2014 | Machnicki | ............ G06F 1/3206 713/320 |
| 2015/0317094 | A1 | 11/2015 | Elhamias et al. | |

FOREIGN PATENT DOCUMENTS

| | | |
|---|---|---|
| TW | 201411640 | 3/2014 |
| TW | 201546819 | 12/2015 |

OTHER PUBLICATIONS

"Office action of Taiwan Related Application, application No. 105110046", dated May 11, 2017, p. 1-p. 4.

* cited by examiner

MEMORY APPARATUS AND ENERGY-SAVING CONTROL METHOD THEREOF

CROSS-REFERENCE TO RELATED APPLICATION

This application claims the priority benefit of Taiwan application serial no. 105110067, filed on Mar. 30, 2016. The entirety of the above-mentioned patent application is hereby incorporated by reference herein and made a part of this specification.

BACKGROUND OF THE INVENTION

Field of the Invention

The invention relates to an electronic apparatus, and more particularly, to a memory apparatus and an energy-saving control method thereof.

Description of Related Art

To save power, an electronic apparatus generally has a plurality of power management modes (such as normal operating state and power-saving state). In general, to make an electronic apparatus more power-saving, hardware manufacturers incorporate many power-saving techniques in the processing unit or the motherboard chipset of the electronic apparatus. For instance, in terms of power control of a computer, the computer may enter hibernation mode to reduce consumption of power, and although power saving can be effectively achieved in this way, the computer often requires a longer time to resume normal operating state from hibernation mode. As a result, the usage quality of the electronic apparatus is reduced. Therefore, how to further reduce power consumption of an electronic apparatus with minimal effect to the usage quality of the electronic apparatus is an important topic.

SUMMARY OF THE INVENTION

The invention provides a memory apparatus and an energy-saving control method thereof capable of further reducing power consumption of the memory apparatus without entering hibernation mode.

The memory apparatus of the invention includes a plurality of non-volatile memory units and a control chip. The control chip is coupled to the non-volatile memory units and coupled to a host computer via a signal transmission interface. The control chip includes a specific circuit group, a memory control unit, and an energy-saving control unit. The specific circuit group is coupled to a clock generation unit. The memory control unit is coupled to the clock generation unit and the non-volatile memory units to control an access to the non-volatile memory units. The energy-saving control unit is coupled to the clock generation unit, the specific circuit group, and the memory control unit. During a period of accessing the non-volatile memory units by the control chip in a normal mode, if the non-volatile memory units are in a busy state, the energy-saving control unit controls the clock generation unit to stop outputting an internal clock signal to the specific circuit group, so as to reduce power consumption of the control chip.

The invention provides an energy-saving control method of a memory apparatus. The memory apparatus includes a plurality of non-volatile memory units and a control chip, the control chip is coupled to a host computer, and the energy-saving control method includes following steps. During a period of accessing the non-volatile memory units by the control chip in a normal mode, whether the non-volatile memory units are all in a busy state is determined. If the non-volatile memory units are all in the busy state, stopping outputting an internal clock signal to a specific circuit group of the control chip, so as to reduce power consumption of the control chip.

Based on the above, in the embodiments of the invention, the internal clock signal sent to the specific circuit group is stopped outputting when the non-volatile memory units are respectively in busy state to reduce power consumption of the control chip. As a result, power consumption of the memory apparatus can be further reduced without entering hibernation mode.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
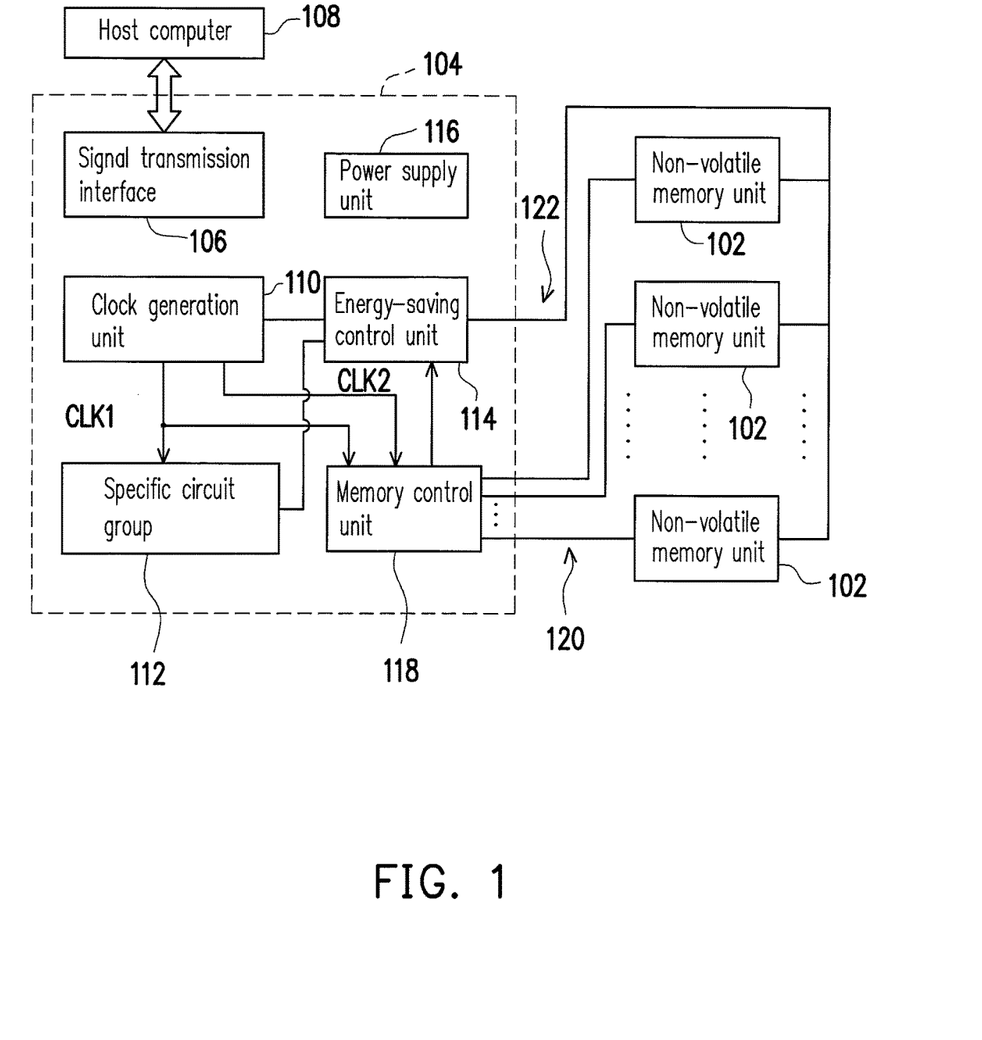
FIG. 1 is a schematic of a memory apparatus according to an embodiment of the invention.

FIG. 1 is a schematic of a memory apparatus according to an embodiment of the invention. Please refer to FIG. 1. The memory apparatus includes a plurality of non-volatile memory units 102 and a control chip 104, wherein the control chip 104 may be coupled to the non-volatile memory units 102 and coupled to a host computer 108 via a signal transmission interface 106. More specifically, the control chip 104 may further include a clock generation unit 110, a specific circuit group 112, an energy-saving control unit 114, a power supply unit 116, and a memory control unit 118. The clock generation unit 110 may generate a plurality of internal clock signals as the basis for the circuits inside the control chip 104 to perform circuit operations. For ease of explanation, only an internal clock signal CLK1 transmitted to the specific circuit group 112 and the memory control unit 118 and an internal clock signal CLK2 transmitted to the memory control unit 118 are shown. In an embodiment, the internal clock signal CLK1 may be the combination of a plurality of internal clock signals. In another embodiment, the internal clock signal CLK1 may also be a single internal clock signal. In an embodiment, the internal clock signal CLK1 is generated by a phase-locked loop circuit of the clock generation unit 110. The internal clock signal CLK2 is generated by an oscillator of the clock generation unit 110.

The memory control unit 118 is coupled to the energy-saving control unit 114, the clock generation unit 110, and the non-volatile memory units 102. The memory control unit 118 may detect the state of the non-volatile memory units 102 according to the internal clock signal CLK2 of the clock generation unit 110, and the memory control unit 118 may include memory processing units (not shown) corresponding to each of the non-volatile memory units 102. The power supply unit 116 may provide a plurality of power signals to circuits inside the control chip 104. The energy-saving control unit 114 is coupled to the clock generation unit 110, the specific circuit group 112, and the memory control unit 118. In normal mode, the energy-saving control unit 114 may determine whether any one of the non-volatile memory units 102 is in busy state, and when the control chip 104 is accessing the non-volatile memory units 102, if any one of the non-volatile memory units 102 is in busy state, then the energy-saving control unit 114 may control the clock generation unit 100 to stop outputting the internal clock signals CLK1 and CLK2 to the specific circuit group 112 and the memory control unit 118, such that the specific circuit group 112 and the memory control unit 118 cannot operate, so as to reduce power consumption of the control chip 104. On the other hand, if the non-volatile memory units 102 is not in busy state, the energy-saving control unit 114 controls the clock generation unit 110 to output the internal clock signals CLK1 and CLK2 to the specific circuit group 112 and the memory control unit 118. In the present embodiment, the control chip 104 has a memory-state pin 122 coupled to the busy-state pins of the plurality of non-volatile memory units 102. The energy-saving control unit 114 determines whether any one of the non-volatile memory units 102 is in busy state according to the memory-state pin 122. For instance, when any one of the non-volatile memory units 102 is in busy state, the state of the memory-state pin 122 is asserted.

In another embodiment, in normal mode, the memory control unit 118 determines whether all of the non-volatile memory units 102 are in busy state. More specifically, the memory control unit 118 may detect whether the non-volatile memory units 102 are respectively in busy state via a plurality of data transmission buses 120 between the control chip 104 and the non-volatile memory units 102. When all of the non-volatile memory units 102 are detected to be in busy state, the memory processing unit (not shown) in the memory control unit 118 does not need to transmit data with the memory control unit 118 when the non-volatile memory units 102 are busy, and therefore the memory control unit 118 sends a notification signal to the energy-saving control unit 114 to notify the energy-saving control unit 114 to control the clock generation unit 110 to stop outputting the internal clock signal CLK1 to the specific circuit group 112 and the memory control unit 118, such that the specific circuit group 112 and a portion of the memory control unit 118 cannot operate, so as to reduce power consumption of the control chip 104. At this point, the internal clock signal CLK2 is still outputted to one of the modules in the memory control unit 118, such that the memory control unit 118 can still detect the state of the non-volatile memory units 102 according to the internal clock signal CLK2. On the other hand, if all of the non-volatile memory units 102 is not in the busy state, the energy-saving control unit 114 controls the clock generation unit 110 to output the internal clock signal CLK1.

Figure 2:
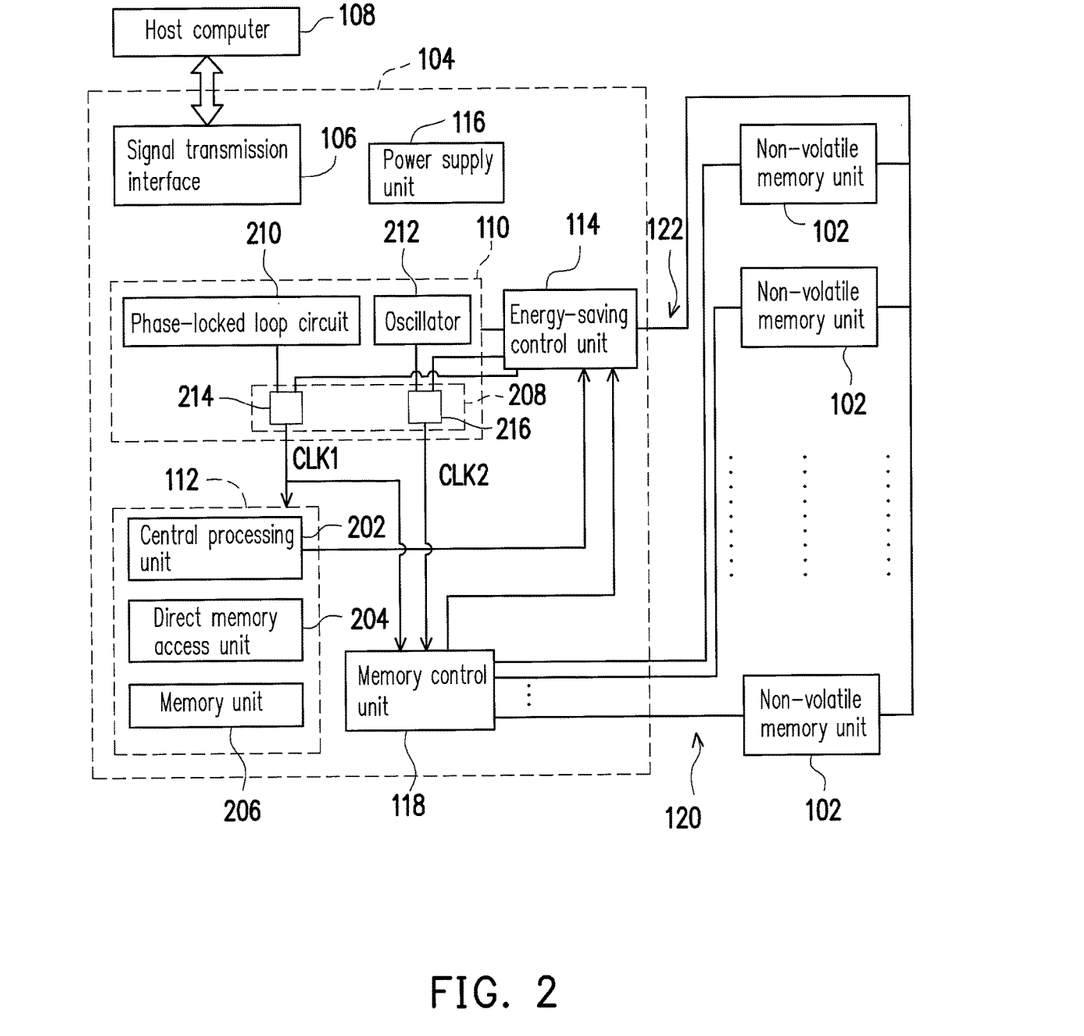
FIG. 2 is a schematic of a memory apparatus according to another embodiment of the invention.

It should be mentioned that, in the present embodiment, the specific circuit group 112 may include circuits which do not need to be operated when the non-volatile memory units 102 are busy. For instance, FIG. 2 is a schematic of a memory apparatus according to another embodiment of the invention. Please refer to FIG. 2. As shown in FIG. 2, the specific circuit group 112 includes a central processing unit 202, a direct memory access unit 204, and a memory unit 206, but is not limited thereto. In particular, the central processing unit 202 is configured to process a data storage command to be sent to the non-volatile memory units 102 or a data read command from the non-volatile memory units 102. However, the invention is not limited thereto, and the memory unit 206 is configured to store the data storage command and the data read command, but the invention is not limited thereto, and the direct memory access unit 204 is configured to access data stored by the memory unit 206. As shown in FIG. 2, the clock generation unit 110 includes a clock output unit 208, a phase-locked loop circuit 210, and an oscillator 212. In an embodiment, the clock output unit 208 contains a first processing unit 214 and a second processing unit 216. The first processing unit 214 is coupled to the phase-locked loop circuit 210 and the energy-saving control unit 114, and the internal clock signal CLK1 is generated by the phase-locked loop circuit 210 according to the signal sent by the energy-saving control unit 114. The second processing unit 216 is coupled to the oscillator 212 and the energy-saving control unit 114, and the internal clock signal CLK2 is generated via the oscillator 212 according to the signal sent by the energy-saving control unit 114. In an embodiment, the first processing unit and the second processing unit may be implemented as AND gates or OR gates, but are not limited thereto.

Moreover, in normal mode, the user may configure the method of detecting the state of the non-volatile memory units 102 according to actual application situation. That is, the energy-saving control unit 114 may determine, according to a configuration command, to stop outputting the internal clock signals CLK1 and CLK2 according to the state of a memory state pin 122, or detect the data transmission buses 120 between the control chip 104 and the non-volatile memory units 102 via the memory control unit 118 to determine whether all of the non-volatile memory units 102 are in busy state, so as to stop outputting the internal clock signal CLK1 accordingly.

In an embodiment, the control chip 104 reads a command and data sent by the host computer 108 via a temporary buffer (not shown), and the temporary buffer is configured to buffer the command and data sent by the host computer 108. When in normal mode and the data transmission buses between the control chip 104 and the temporary buffer (not shown) do not transmit data, the energy-saving control unit 114 stops outputting the internal clock signals CLK1 and CLK2 according to the state of the memory state pin 122 again, or detects the data transmission buses 120 between the control chip 104 and the non-volatile memory units 102 via the memory control unit 118 to determine whether all of the non-volatile memory units 102 are in busy state, so as to stop outputting the internal clock signal CLK1 accordingly.

Figure 3:
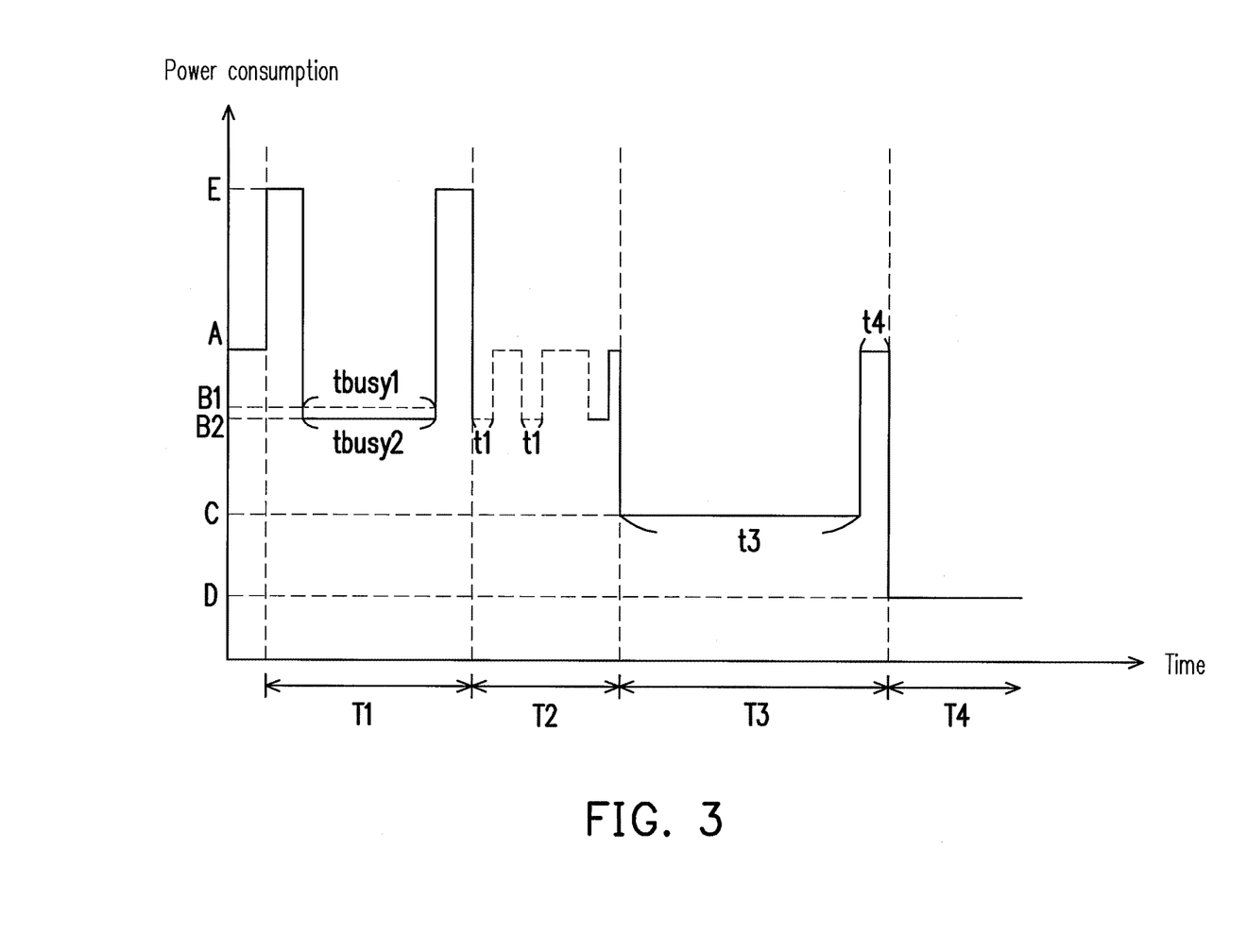
FIG. 3 is a power consumption schematic of a control chip according to an embodiment of the invention.

FIG. 3 is a power consumption schematic of a control chip according to an embodiment of the invention. Please refer to FIG. 3. When the control chip 104 is in normal mode (i.e., T1 period) and all of the non-volatile memory units 102 are in busy state, the energy-saving control unit 114 controls the clock generation unit 110 to stop outputting the internal clock signal CLK1, or in another embodiment, when any one of the non-volatile memory units 102 is in busy state, the energy-saving control unit 114 controls the clock generation unit 110 to stop outputting the internal clock signals CLK1 and CLK2 to reduce power consumption of the control chip 104 (such as respectively shown in the power consumptions in tbusy1 and tbusy2 periods). At this point, the power consumption of the control chip 104 is respectively at levels B1 and B2 of FIG. 3. On the other hand, if all of the non-volatile memory units 102 is not in the busy state, the energy-saving control unit 114 controls the clock generation unit 110 to output the internal clock signals CLK1 and CLK2, and at this point, the power consumption of the control chip 104 is at level A or E of FIG. 3. Via the above method, dynamic energy saving of the control chip in normal mode can be achieved. Moreover, the central processing unit 202 may further determine whether the host computer 108 sends a processing command to the signal transmission interface 106, and when the central processing unit 202 determines that no processing command is to be processed currently and current events are finished being processed, the central processing unit 202 emits a signal to notify the energy-saving control unit 114 to control the clock generation unit 110 to stop outputting the internal clock signals CLK1 and CLK2. At this point, the control chip 104 enters standby mode. In particular, during standby mode (i.e., T2 period), the operating clocks of the other internal circuits are all reduced or turned off to reduce power consumption except the energy-saving control unit 114, the clock generation unit 110, and the power supply unit 116 in the control chip 104. At this point, the power consumption of the control chip 104 is at level B2 of FIG. 3.

It should be mentioned that, the power consumption levels shown in FIG. 3 are only an embodiment of the invention, and are not limited thereto in actual application. The amount of power consumption actually corresponding to each mode may be different due to actual circuit design. However, the relative relationship of the amount of power consumption between each mode is fixed, and the power consumption between each mode is, in the order of low to high, hibernation mode, sleep mode, standby mode, and normal mode.

In another embodiment, the energy-saving control unit 114 further configures a timer (not shown). During standby mode, after the timer counts a fixed time (i.e., t1 period), the energy-saving control unit 114 controls the clock generation unit 110 to output the internal clock signals CLK1 and CLK2 to the specific circuit group 112 and the memory control unit 118, such that the specific circuit group 112 and the memory control unit 118 can operate, and the central processing unit 202 can determine whether a processing command sent by the host computer 108 is present. At this point, the power consumption of the control chip 104 is at level A of FIG. 3. During standby mode and after the operation of the specific circuit group 112 and the memory control unit 118, if the host computer 108 sends a processing command to the signal transmission interface 106 at this point, then the central processing unit 202 can immediately perform processing, and when the central processing unit 202 determines that no processing command sent by the host computer 108 is currently present, the central processing unit 202 sends a signal to notify the energy-saving control unit 114 to control the clock generation unit 110 to stop outputting the internal clock signals CLK1 and CLK2 again. The power consumption of the control chip 104 returns to level B2 of FIG. 3 again. At this point, the timer is configured again (or reset again), and after counting the fixed time (i.e., t1 period), the energy-saving control unit 114 controls the clock generation unit 110 to output the internal clock signals CLK1 and CLK2 to the specific circuit group 112 and the memory control unit 118, such that the specific circuit group 112 and the memory control unit 118 can operate. The following steps are the same as the previous steps and are therefore not repeated herein. The periodic counting operation is mainly to allow the control chip 104 to detect whether the host computer 108 sends a processing command in standby mode and return to normal mode for processing at maximum speed. In an embodiment, the periodic counting operation may also allow the control chip 104 to perform memory-related background events or the monitoring and the management operations of specific events in standby mode, so as to perform a resource management mechanism of the memory, such as garbage collection. In an embodiment, the timer may also be disposed inside or outside the energy-saving control unit 114.

In another embodiment, the timer may also be configured for aperiodic counting operation. In other words, the timer may be configured to count a fixed time once.

After entering standby mode, the energy-saving control unit 114 detects whether the host computer 108 sends a processing command to the signal transmission interface 106. If yes, then the energy-saving control unit 114 controls the clock generation unit 110 to output the internal clock signals CLK1 and CLK2 to the specific circuit group 112 to wake up the specific circuit group 112 and the memory control unit 118 so as to enter normal mode. At this point, the power consumption of the control chip 104 returns to power consumption level A (such as t4 period) in normal mode. At this point, the central processing unit 202 can immediately process the processing command issued by the host computer 108.

In the present embodiment, since the specific circuit group or the memory control unit is disabled by stopping outputting the internal clock signal to the specific circuit group or the memory control unit via the gap in which the non-volatile memory units 102 are in busy state in normal mode, and the specific circuit group and the memory control unit are waken to operate by the counting operation in standby mode, after the internal clock signal is outputted again to the specific circuit group and the memory control unit, the control chip can rapidly resume the state of normal operation. As a result, the invention can have the advantages of rapid response and relatively lower power consumption in comparison to prior art.

Moreover, after entering standby mode, when the specific circuit group and the memory control unit operate, the central processing unit 202 may further determine whether the configuration number (or reset number) of the timer exceeds a preset value. If yes, then the central processing unit 202 sends a signal to notify the energy-saving control unit 114 to turn off the phase-locked loop circuit 210 and the oscillator 212 of the clock generation unit 110, so as to control the clock generation unit 110 to stop outputting the internal clock signals CLK1 and CLK2. At this point, the control chip 104 enters sleep mode (i.e., T3 period) to further reduce power consumption. In an embodiment, the energy-saving control unit 114 further turns off a portion of the power supplied by the power supply unit 116 to the memory unit 206 such that only the firmware program, a portion of the table, and variable information stored in the memory unit 206 are still maintained. The preset value may be 0, and may also be other values. In another embodiment, during sleep mode, except the energy-saving control unit 114 and the power supply unit 116 in the control chip 104, the operating clocks of the other internal circuits are all reduced or turned off to reduce power consumption. In sleep mode, the power consumption of the control chip 104 is maintained at level C of FIG. 3.

In another embodiment, after entering standby mode, when the specific circuit group and the memory control unit operate, the central processing unit 202 may further determine whether the host computer 108 sends a hibernation command to the signal transmission interface 106. If yes, then the central processing unit 202 sends a signal notifying the energy-saving control unit 114 to turn off the phase-locked loop circuit 210 and the oscillator 212 of the clock generation unit 110, so as to control the clock generation unit 110 to stop outputting the internal clock signals CLK1 and CLK2. At this point, the control chip 104 enters hibernation mode (i.e., T4 period). In an embodiment, the energy-saving control unit 114 further turns off a portion of the power supplied by the power supply unit 116 to the memory unit 206 such that only a portion of the firmware program and variable information stored in the memory unit 206 are still maintained, so as to further reduce power consumption. In another embodiment, in hibernation mode, the energy-saving control unit 114 can further reduce the power supplied by the power supply unit 116 to the other internal circuits inside the control chip 104, that is, reduce the operating voltage of the circuits inside the control chip 104 to reduce power consumption. In hibernation mode, the power consumption of the control chip 104 is maintained at level D of FIG. 3. After entering standby mode, when the specific circuit group and the memory control unit operate, other commands other than the hibernation command are sent by the host computer 108, and the central processing unit 202 can immediately perform processing.

In another embodiment, when the control chip 104 receives a hibernation command or a power-off command sent by a host computer in normal mode, the control chip 104 directly enters hibernation mode.

In other embodiments, the control chip 104 may enter either sleep mode or hibernation mode according to a preset signal in standby mode.

As shown in FIG. 3, during sleep mode of the t3 period, the energy-saving control unit 114 detects whether the host computer 108 sends a hibernation command to the signal transmission interface 106. If yes, then the energy-saving control unit 14 first enables the phase-locked loop circuit 210 and the oscillator 212 to control the clock generation unit 110 to output the internal clock signals CLK1 and CLK2 to the specific circuit group 112, so as to wake up the specific circuit group 112 and the memory control unit 118. At this point, the power consumption of the control chip 104 returns to power consumption level A (such as t4 period) in normal mode. At this point, the central processing unit 202 can immediately process the hibernation command issued by the host computer 108. After the central processing unit 202 identifies the hibernation command, the central processing unit 202 sends a signal again to notify the energy-saving control unit 114 to disable the phase-locked loop circuit 210 and the oscillator 212 such that the specific circuit group 112 and the memory control unit 118 do not operate, so as to enter hibernation mode. In an embodiment, the energy-saving control unit 114 further turns off a portion of the power supplied by the power supply unit 116 to the memory unit 206 such that only a portion of the firmware program and variable information stored in the memory unit 206 are still maintained, so as to reduce power consumption. In hibernation mode, the power consumption of the control chip 104 is maintained at level D of FIG. 3. In comparison to other modes of operation, in hibernation mode, the power consumption of the control chip 104 is lowest.

Moreover, although the control chip 104 is in hibernation mode, the power consumption of the control chip 104 is lowest. However, the time that the control chip 104 takes to return from hibernation mode to normal mode is longest. Sleep mode is second longest and standby mode is third longest.

In sleep mode or hibernation mode, the energy-saving control unit 114 detects whether the host computer 108 sends a processing command to the signal transmission interface 106. If yes, then the energy-saving control unit 114 first enables the phase-locked loop circuit 210 and the oscillator 212 to control the clock generation unit 110 to output the internal clock signals CLK1 and CLK2 to the specific circuit group 112 so as to wake up the specific circuit group 112 and the memory control unit 118. In other embodiments, the energy-saving control unit 114 also restores a portion of the power supplied by the power supply unit 116 to the memory unit 206, or restores the power of the other internal circuits supplied by the power supply unit 116 to the control chip 104, so as to enter normal mode. At this point, the power consumption of the control chip 104 returns to power consumption level A (such as t4 period) in normal mode. At this point, the central processing unit 202 can immediately process the processing command issued by the host computer 108.

Figure 4:
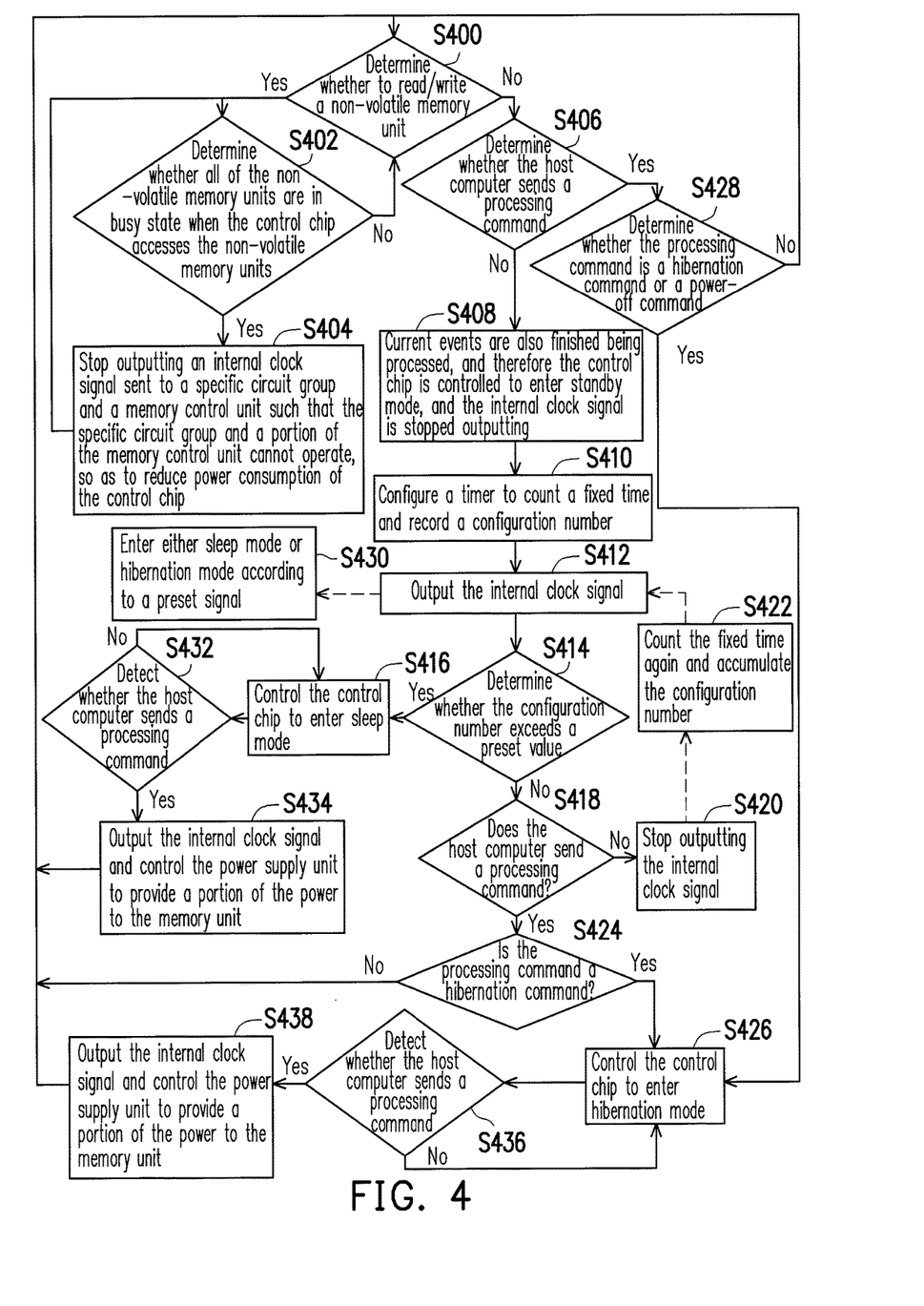
FIG. 4 is a flow schematic of the energy-saving control method of a memory apparatus according to an embodiment of the invention.

FIG. 4 is a flow schematic of the energy-saving control method of a memory apparatus according to an embodiment of the invention. Please refer to FIG. 4. It can be known from the above embodiments that, the energy-saving control method of the memory apparatus may include the following steps. First, step S400 is performed. In normal mode, whether a command sent by a host computer is a command of a read/write non-volatile memory unit is determined. If yes, then whether all of the non-volatile memory units are in busy state is determined when the control chip accesses the non-volatile memory units (step S402), and the method of determining whether all of the non-volatile memory units are in busy state may include, for instance, detecting whether all of the non-volatile memory units are in busy state via data transmission buses between the control chip and the non-volatile memory units. If all of the non-volatile memory units are in busy state, then stopping outputting the internal clock signal to the specific circuit group and the memory control unit, such that the specific circuit group and a portion of the memory control unit cannot operate, so as to reduce power consumption of the control chip (step S404), wherein the specific circuit group may include, for instance, a central processing unit, a memory unit, and a direct memory access unit. Then, step S402 is performed again.

On the contrary, if not all of the non-volatile memory units are in busy state, then step S400 is performed again. If the command sent by a host computer is not a command of a read/write non-volatile memory unit, then the control chip determines whether the host computer sends a processing command to the signal transmission interface (step S406). If the control chip determines that no processing command is to be processed currently and current events are finished being processed, then the control chip is controlled to enter standby mode, and the internal clock signal is stopped outputting to the specific circuit group and the memory control unit (step S408). At this point, power consumption can further be reduced by, for instance, reducing or turning off the operating clocks of the internal circuits of the control chip. If the control chip determines that the host computer sends a processing command to the signal transmission interface in normal mode, then whether the processing command is a hibernation command or a power-off command is determined next (step S428). If yes, then the control chip is controlled to enter hibernation mode (step S426). If not, then step S400 is performed again. In particular, in hibernation mode, a portion of the power supplied to the memory unit is turned off such that only a portion of the firmware program and variable information stored in the memory unit are still maintained, so as to reduce power consumption.

In standby mode, a timer is configured to count a fixed time and record a configuration number (step S410). After the timer counts the fixed time, the internal clock signal is outputted to the specific circuit group and the memory control unit (step S412) such that the specific circuit group and the memory control unit can operate, so as to determine whether a processing command sent by the host computer is present. In an embodiment, whether the configuration number exceeds a preset value can be determined next (step S414). If yes, then the control chip is controlled to enter sleep mode (step S416), wherein in sleep mode, the internal clock signal sent to the specific circuit group and the memory control unit is stopped outputting. If not, then whether the host computer sends a processing command to the signal transmission interface is determined (step S418). When the host computer is in standby mode and after the specific circuit group and the memory control unit operate, if the host computer sends a processing command to the signal transmission interface at this point, then whether the processing command is a hibernation command is determined (step S424). If yes, then the control chip is controlled to enter hibernation mode (step S426). If not, then step S400 is performed again. In step S418, when the host computer is in standby mode and after the specific circuit group and the memory control unit operate, if the host computer does not send a processing command to the signal transmission interface at this point, then the internal clock signal to the specific circuit group and the memory control unit is stopped outputting (step S420), such that the specific circuit group and the memory control unit stop operating, so as to reduce power consumption.

In another embodiment, the timer may also be configured for periodic counting operation. In other words, after step S420, the timer may be configured again to count the fix time and accumulate the configuration number (step S422). Then, step S412 is performed again, and the internal clock signal is outputted to the specific circuit group and the memory control unit, such that the specific circuit group and the memory control unit can operate, so as to determine whether a processing command sent by the host computer is present. The following steps are the same as the previous steps and are therefore not repeated herein. The periodic counting operation is mainly to allow the control chip to detect whether the host computer sends a processing command in standby mode and return to normal mode for processing at maximum speed.

In another embodiment, after step S410 in which the timer is only configured to count a fixed time, step S412 is performed next, and after the timer counts the fixed time, the internal clock signal is outputted to the specific circuit group and the memory control unit. In an embodiment, after step S412, step S430 is performed next, and the control chip enters either sleep mode (step S416) or hibernation mode (step S426) according to a preset signal in standby mode.

After step S416, the energy-saving control unit 114 detects whether the host computer sends a processing command to the signal transmission interface (step S432). If yes, then the energy-saving control unit 114 first enables the phase-locked loop circuit 210 and the oscillator 212 to control the clock generation unit 110 to output the internal clock signals CLK1 and CLK2 to the specific circuit group 112 so as to wake up the specific circuit group 112 and the memory control unit 118, and the power supply unit 116 is controlled to provide a portion of the power of the memory unit 206 (step S434), and then step S400 is performed again. If not, then step S416 is performed again.

After step S426, the energy-saving control unit 114 detects whether the host computer sends a processing command to the signal transmission interface (step S436). If yes, then the energy-saving control unit 114 first enables the phase-locked loop circuit 210 and the oscillator 212 to control the clock generation unit 110 to output the internal clock signals CLK1 and CLK2 to the specific circuit group 112 so as to wake up the specific circuit group 112 and the memory control unit 118. The energy-saving control unit 114 further controls the power supply unit 116 to provide a portion of the power of the memory unit 206 (step S438), and then step S400 is performed again. If not, then step S426 is performed again.

Figure 5:
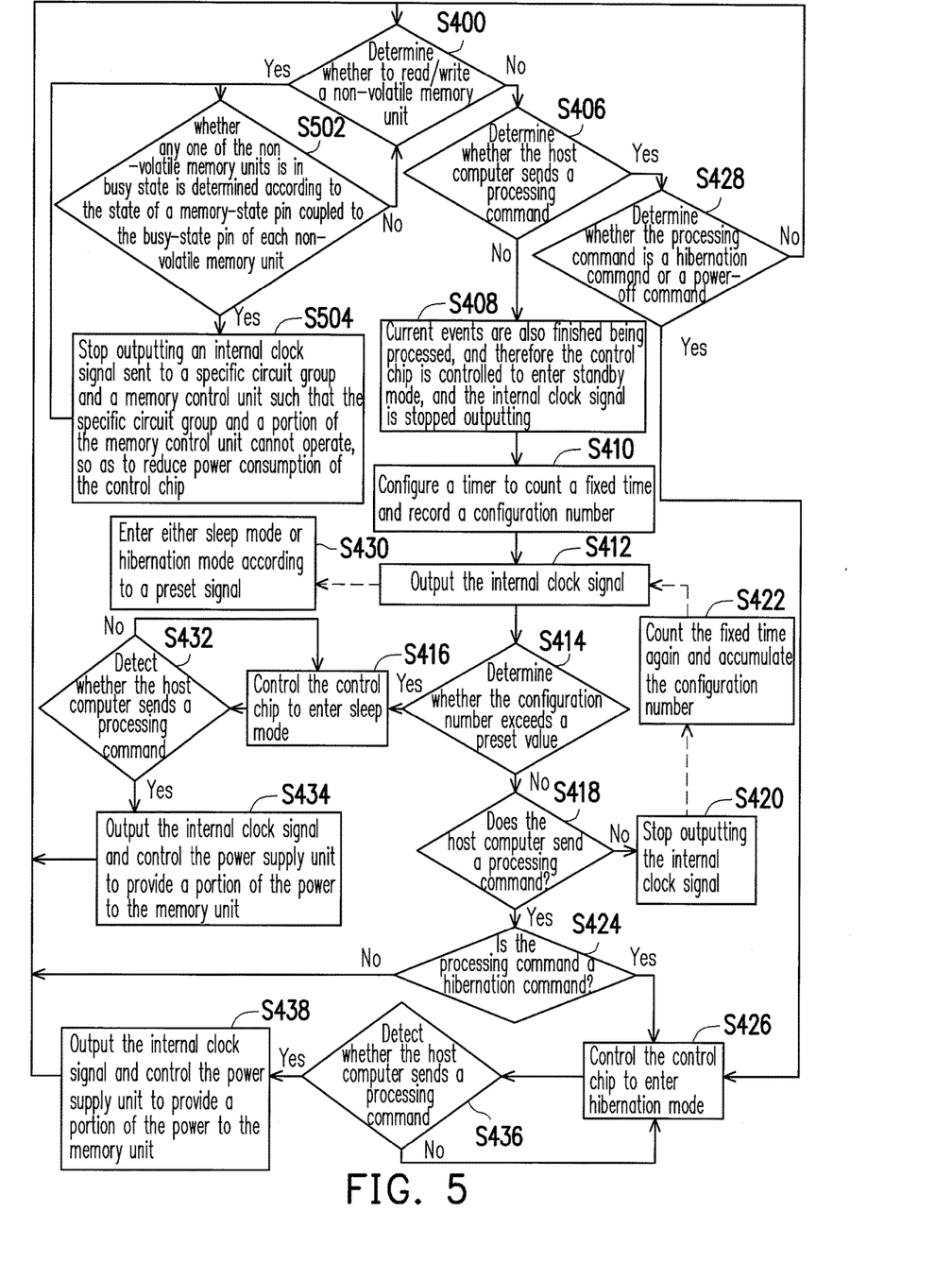
FIG. 5 is a flow schematic of the energy-saving control method of a memory apparatus according to another embodiment of the invention.

FIG. 5 is a flow schematic of the energy-saving control method of a memory apparatus according to an embodiment of the invention. Please refer to FIG. 5. The difference between the present embodiment and the embodiment of FIG. 4 is that, in the present embodiment, when the control chip accesses the non-volatile memory units, whether any one of the non-volatile memory units is in busy state is determined according to the state of a memory-state pin coupled to the busy-state pin of each non-volatile memory unit (step S502). When the control chip accesses the non-volatile memory units, if any one of the non-volatile memory units is in busy state, then the internal clock signal sent to the specific circuit group and the memory control unit is stopped outputting, such that the specific circuit group and the memory control unit cannot operate, so as to reduce power consumption of the control chip (step S504). Then, step S502 is performed again. If none of the non-volatile memory units is in busy state, then step S400 is performed and the other steps S406 to S438 are all the same as the embodiment of FIG. 4, and are not repeated herein. In particular, the user may control the control chip via a configuration command according to actual application demand to stop outputting the internal clock signal to the specific circuit group according to the state of the memory-state pin, or detect a plurality of data transmission buses between the control chip and the non-volatile memory units via the memory control unit 118 to determine whether the non-volatile memory units are respectively in busy state, so as to stop outputting the internal clock signal to the specific circuit group accordingly.

It should be mentioned that, the mode conversions exemplified in the embodiments of FIG. 3, FIG. 4, and FIG. 5 are only exemplary, and are not actually limited thereto. The memory apparatus may change between the modes in response to different usage situations of the user. That is, the control chip may change between hibernation mode, sleep mode, standby mode, and normal mode in response to the usage situation of the user, and the changing order is not limited to the embodiments shown in FIG. 3, FIG. 4, and FIG. 5.

Based on the above, in the embodiments of the invention, the specific circuit group or the memory control unit is disabled by stopping outputting the internal clock signal to the specific circuit group and the memory control unit via the gap in which the non-volatile memory units are in busy state in normal mode, and the specific circuit group and the memory control unit are waken to operate by the counting operation in standby mode. As a result, power consumption of the control chip is dynamically reduced. After the internal clock signal is outputted again to the specific circuit group and the memory control unit, the control chip can rapidly resume normal operating state, and therefore the invention can have the advantages of rapid response and relatively lower power consumption in comparison to prior art.

What is claimed is:

1. A memory apparatus comprising:
   a plurality of non-volatile memory units; and
   a control chip coupled to the non-volatile memory units and coupled to a host computer via a signal transmission interface, the control chip comprising:
   a specific circuit group coupled to a clock generation unit;
   a memory control unit coupled to the clock generation unit and the non-volatile memory units to control an access to the non-volatile memory units; and
   an energy-saving control unit coupled to the clock generation unit, the specific circuit group, and the memory control unit, wherein in a normal mode and during a period of accessing the non-volatile memory units by the control chip, if the non-volatile memory units are in a busy state, the energy-saving control unit controls the clock generation unit to stop outputting an internal clock signal to the specific circuit group, so as to reduce power consumption of the control chip.

2. The memory apparatus of claim 1, wherein the memory control unit further detects whether the non-volatile memory units are all in the busy state via a plurality of data transmission buses between the control chip and the non-volatile memory units, and if the non-volatile memory units are all detected to be in the busy state, the memory control unit sends a notification signal to the energy-saving control unit to control the clock generation unit to stop outputting the internal clock signal to the specific circuit group and the memory control unit.

3. The memory apparatus of claim 1, wherein the memory control unit further determines whether any of the non-volatile memory units is in the busy state according to a state of a memory-state pin coupled to the non-volatile memory units, and if any of the non-volatile memory units is detected to be in the busy state during the period of accessing the non-volatile memory units by the control chip, the energy-saving control unit controls the clock generation unit to stop outputting the internal clock signal to the specific circuit group and the memory control unit.

4. The memory apparatus of claim 1, wherein according to a configuration command, the energy-saving control unit further determines to stop outputting the internal clock signal according to a state of a memory-state pin of the control chip or the energy-saving control unit detects a plurality of data transmission buses between the control chip and the non-volatile memory units via the memory control unit to determine whether the non-volatile memory units are all in the busy state, so as to stop outputting the internal clock signal.

5. The memory apparatus of claim 1, wherein in the normal mode the control chip further determines whether the host computer sends a processing command to the signal transmission interface, and if the control chip determines that no processing command is to be processed at present, and that current events are completely processed, the energy-saving control unit controls the clock generation unit to stop outputting the internal clock signal to the specific circuit group and the memory control unit, such that the control chip enters a standby mode, wherein power consumption of the control chip in the standby mode is less than the power consumption of the control chip in the normal mode.

6. The memory apparatus of claim 5, in the standby mode, the energy-saving control unit configuring a timer, after the timer counts a fixed time, the energy-saving control unit controlling the clock generation unit to output the internal clock signal to the specific circuit group and the memory control unit.

7. The memory apparatus of claim 6, in the standby mode, if the host computer does not send the processing command, the energy-saving control unit controlling the clock generation unit to stop outputting the internal clock signal to the specific circuit group and the memory control unit.

8. The memory apparatus of claim 7, wherein when the energy-saving control circuit controls the clock generation unit to stop outputting the internal clock signal, the energy-saving control unit configures the timer again.

9. The memory apparatus of claim 6, in the standby mode, wherein when the host computer sends a processing command, a central processing unit in the specific circuit group processes the processing command.

10. The memory apparatus of claim 6, wherein in the standby mode, a central processing unit in the specific circuit group is further configured to determine whether a configuration number of the timer exceeds a preset value, if the configuration number of the timer exceeds the preset value, the central processing unit notifies the energy-saving control unit to turn off the clock generation unit to stop outputting the internal clock signal to the specific circuit group and the memory control unit, and the energy-saving control unit controls the control chip to enter a sleep mode, wherein power consumption of the control chip in the sleep mode is less than the power consumption of the control chip in the standby mode.

11. The memory apparatus of claim 10, wherein the clock generation unit further comprises a clock output unit, a phase-locked loop circuit, and an oscillator, and in the sleep mode, the energy-saving control unit further disables the phase-locked loop circuit and the oscillator.

12. The memory apparatus of claim 10, wherein the clock generation unit further comprises a clock output unit, a phase-locked loop circuit, and an oscillator, and in the sleep mode, the energy-saving control unit detects whether the host computer sends a hibernation command to the signal transmission interface, if yes, the energy-saving control unit controls the clock generation unit to output the internal clock signal to the specific circuit group, so as to allow the central processing unit to notify the energy-saving control unit of disabling the phase-locked loop circuit and the oscillator and turning off a portion of power supplied by a power supply unit to a memory unit, and the control chip enters a hibernation mode, wherein the memory unit is configured to store a data storage command and a data read command.

13. The memory apparatus of claim 6, wherein in the standby mode, a central processing unit in the specific circuit group is further configured to determine whether the host computer sends a hibernation command to the signal transmission interface, when the host computer sends the hibernation command to the signal transmission interface, the energy-saving control unit turns off the clock generation unit to stop outputting the internal clock signal to the specific circuit group and the memory control unit, and the energy-saving control unit further turns off a portion of power supplied by a power supply unit to a memory unit and controls the control chip to enter a hibernation mode.

14. The memory apparatus of claim 5, wherein after entering the standby mode, when the energy-saving control unit detects that the host computer sends the processing command to the signal transmission interface, the energy-saving control unit controls the clock generation unit to output the internal clock signal to the specific circuit group and the memory control unit to wake up the specific circuit group and the memory control unit, so as to enter the normal mode.

15. The memory apparatus of claim 5, wherein the control chip in the standby mode enters either a sleep mode or a hibernation mode from the standby mode according to a preset signal, wherein power consumption of the control chip in the hibernation mode is less than power consumption of the control chip in the sleep mode, and the power consumption of the control chip in the sleep mode is less than the power consumption of the control chip in the standby mode.

16. The memory apparatus of claim 1, wherein when the control chip in the normal mode receives a hibernation command or a power-off command sent by the host computer, the control chip directly enters a hibernation mode, and the power consumption of the control chip is minimized when the control chip is in the hibernation mode.

17. The memory apparatus of claim 1, wherein the control chip further comprises a power supply unit providing a plurality of power signals to circuits in the control chip, the clock generation unit further comprises a clock output unit, a phase-locked loop circuit, and an oscillator, in a hibernation mode, the energy-saving control unit further disables the phase-locked loop circuit and the oscillator and turns off a portion of power supplied by the power supply unit to a memory unit, the power consumption of the control chip is minimized when the control chip is in the hibernation mode, and the memory unit is configured to store a data storage command and a data read command.

18. The memory apparatus of claim 1, wherein the specific circuit group further comprises:
    a central processing unit processing a data storage command to be transmitted to the non-volatile memory units or a data read command from the non-volatile memory units;
    a memory unit storing the data storage command and the data read command; and
    a direct memory access unit accessing data stored in the memory unit.

19. An energy-saving control method of a memory apparatus, the memory apparatus comprising a plurality of non-volatile memory units and a control chip, the control chip being coupled to a host computer, the energy-saving method comprising:
    determining whether the non-volatile memory units are all in a busy state during a period of accessing the non-volatile memory units by the control chip in a normal mode; and
    if the non-volatile memory units are all in the busy state, stopping outputting an internal clock signal to a specific circuit group of the control chip, so as to reduce power consumption of the control chip.

20. The energy-saving control method of claim 19, wherein the control chip further comprises a memory control unit configured to control the access to the non-volatile memory units, and the energy-saving control method comprises:
    detecting by the memory control unit whether the non-volatile memory units are all in the busy state via a plurality of data transmission buses between the control chip and the non-volatile memory units; and
    stopping outputting the internal clock signal to the specific circuit group and the memory control unit if the non-volatile memory units are all detected to be in the busy state.

21. The energy-saving control method of claim 19, further comprising:
    determining whether any of the non-volatile memory units is in the busy state according to a state of a memory-state pin coupled to the non-volatile memory units; and
    stopping outputting the internal clock signal to the specific circuit group and the memory control unit if any of the non-volatile memory units is detected to be in the busy state during the period of accessing the non-volatile memory units by the control chip.

22. The energy-saving control method of claim 19, further comprising:
    according to a configuration command, determining to stop outputting the internal clock signal according to a state of a memory-state pin of the control chip, or detecting a plurality of data transmission buses between the control chip and the non-volatile memory units via the memory control unit to determine whether the non-volatile memory units are all in the busy state, so as to stop outputting the internal clock signal.

23. The energy-saving control method of claim 19, further comprising:
    in the normal mode, determining whether the host computer sends a processing command;
    if no processing command is determined to be processed at present, and if current events are completely processed, stopping outputting the internal clock signal to the specific circuit group and the memory control unit, such that the control chip enters a standby mode, wherein power consumption of the control chip in the standby mode is less than the power consumption of the control chip in the normal mode.

24. The energy-saving control method of claim 23, further comprising:
    in the standby mode, configuring a timer to count time and outputting the internal clock signal to the specific circuit group and the memory control unit after the timer counts a fixed time.

25. The energy-saving control method of claim 24, further comprising:
    in the standby mode, stopping outputting the internal clock signal to the specific circuit group and the memory control unit if the host computer does not send any processing command.

26. The energy-saving control method of claim 25, wherein the timer is configured again when the internal clock signal is stopped outputting.

27. The energy-saving control method of claim 24, further comprising:
    when the host computer sends a processing command in the standby mode, processing the processing command by a central processing unit in the specific circuit group.

28. The energy-saving control method of claim 24, further comprising:
    determining whether a configuration number of the timer exceeds a preset value by a central processing unit of the specific circuit group in the standby mode;
    if the configuration number of the timer exceeds the preset value, stopping outputting the internal clock signal to the specific circuit group and the memory control unit and controlling the control chip to enter a sleep mode, wherein power consumption of the control chip in the sleep mode is less than the power consumption of the control chip in the standby mode.

29. The energy-saving control method of claim 28, further comprising:
   in the sleep mode, detecting whether the host computer sends a hibernation command; and
   if yes, outputting the internal clock signal to the specific circuit group and turning off a portion of power supplied to a memory unit, such that the control chip enters a hibernation mode, wherein the memory unit is configured to store a data storage command and a data read command.

30. The energy-saving control method of claim 24, further comprising:
   determining whether the host computer sends a hibernation command by a central processing unit of the specific circuit group in the standby mode;
   if the host computer sends the hibernation command, stopping outputting the internal clock signal to the specific circuit group, turning off a portion of power supplied to a memory unit, and controlling the control chip to enter a hibernation mode, wherein the memory unit is configured to store a data storage command and a data read command.

31. The energy-saving control method of claim 23, further comprising:
   after entering the standby mode, outputting the internal clock signal to the specific circuit group and the memory control unit to wake up the specific circuit group and the memory control unit to enter the normal mode if the host computer sends the processing command.

32. The energy-saving control method of claim 23, further comprising:
   in the standby mode, entering either a sleep mode or a hibernation mode from the standby mode according to a preset signal, wherein power consumption of the control chip in the hibernation mode is less than power consumption of the control chip in the sleep mode, and the power consumption of the control chip in the sleep mode is less than the power consumption of the control chip in the standby mode.

33. The energy-saving control method of claim 19, further comprising:
   in the normal mode, if a hibernation command or a power-off command sent by the host computer is received, the control chip directly entering a hibernation mode, wherein the power consumption of the control chip is minimized when the control chip is in the hibernation mode.

* * * * *